United States Patent [19]

Wang

[11] Patent Number: 5,056,805
[45] Date of Patent: Oct. 15, 1991

[54] STROLLER

[76] Inventor: Chia-Ho Wang, 12F, No. 311, Fu-Hsing N. Rd., Taipei City, Taiwan

[21] Appl. No.: 533,427
[22] Filed: Jun. 5, 1990
[51] Int. Cl.⁵ .............................................. B62D 9/20
[52] U.S. Cl. .......................... 280/47.36; 280/47.371; 280/643; 280/658; 403/93
[58] Field of Search ................... 280/47.36, 643, 642, 280/648, 647, 658, 47.371; 403/93, 97

[56] References Cited

U.S. PATENT DOCUMENTS

| 4,102,010 | 7/1978 | Lazazzero | 280/47.371 |
| 4,731,896 | 3/1988 | LaTour | 403/93 |
| 4,906,017 | 3/1990 | Kassai | 280/47.36 |
| 4,924,725 | 5/1990 | Takahashi et al. | 280/47.371 |

Primary Examiner—David M. Mitchell
Attorney, Agent, or Firm—Fleit, Jacobson, Cohn, Price, Holman & Stern

[57] ABSTRACT

A stroller comprises a wheeled carriage frame, a pair of hollow upwardly inclining rear frame supports mounted to the wheeled carriage frame, and a pair of hollow connecting pieces telescopically connected to the rear frame supports. A substantially U-shaped handle has a pair of arm portions rotatably connected to the connecting pieces. The U-shaped handle can thus be rotated relative to the rear frame supports. The telescopic connection between the connecting pieces and the rear frame supports allow the adjustment of the height of the U-shaped handle. The rear frame supports are movable between two positions on a pair of arm rests of the stroller. Each of the rear frame supports has a movable hook body attached thereto to selectively lock the rear frame support against one of the arm rests at one of the two locking positions. A handle lever, hinged to each of the connecting pieces, is operated to move the movable hook body away from the locking position by means of a transmitting cord interconnecting the handle lever and the movable hook body. The rear frame supports can thus be moved to the other locking position on the arm rests to change the position from which the stroller is pushed.

3 Claims, 7 Drawing Sheets

STROLLER

BACKGROUND OF THE INVENTION

The invention relates to a stroller, more particularly to a stroller having a handle which can be adjusted in three different ways.

Figure 1:
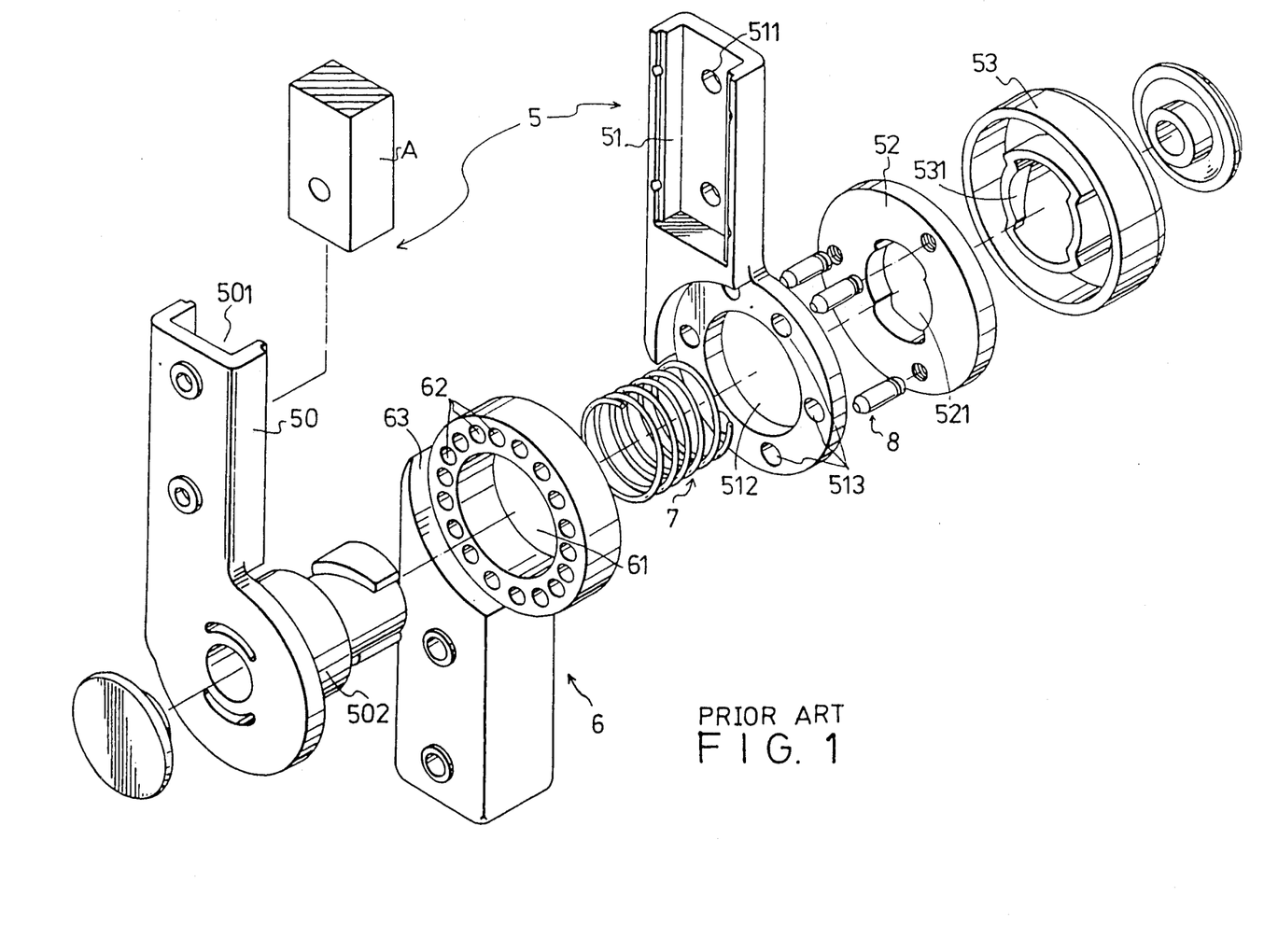
FIG. 1 is an exploded view of the connecting means between the handle and the rear frame support of a conventional stroller.

FIG. 1 is an illustration showing the connecting means between a handle A and a rear frame support 6 of a conventional stroller. The rear frame support 6 has a curved face 63 with a ring member 61 projecting therefrom. The ring member 61 has a plurality of through holes 62 distributed throughout its perimeter. A first b-shaped casing half 50 has a cam member 502 projecting through the ring member 61. A second b-shaped casing half 51 has a circular hole 512 aligned with the central hole of the ring member 61. A plurality of through holes 513 are similarly formed near the perimeter of the circular hole 512 and are to be selectively aligned with the through holes 62 of the ring member 61. A bearing plate 52 has locking pins 8 which project into the through holes 513 and 62. The bearing plate 52 has a central opening 521 which complements the cam member 502. A compression spring 7 is disposed between the bearing plate 52 and the first b-shaped casing half 50. A rotary knob 53 has an innermost wall 531 which receives the cam member 502. The handle A has one end fastened in a space formed between grooves 501 and 511 of the first and second b-shaped casing halves 50 and 51. The knob 53 is turned to rotate the handle A relative to the rear frame support 6.

A main disadvantage of the conventional stroller described in the preceding paragraph is that the construction of its connecting means makes it relatively difficult to adjust the position of the handle with respect to the rear frame support.

Another disadvantage of the conventional stroller is that the height of the handle is fixed. It is only the degree of inclination of the handle with respect to the rear frame support that can be varied.

SUMMARY OF THE INVENTION

Therefore, an object of this invention is to provide a stroller that has a handle whose angle of inclination with respect to a rear frame support can be easily adjusted.

Another object of this invention is to provide a stroller that has a handle whose height can be adjusted.

A further object of this invention is to provide a stroller having an adjustable handle that permits the same to be pushed from the front or from the rear to allow changes in the position, relative to the stroller, of the person pushing it.

Accordingly, the preferred embodiment of a stroller of this invention comprises a wheeled carriage frame; a pair of hollow upwardly inclining rear frame supports mounted to the wheeled carriage frame; and a pair of hollow connecting pieces telescopically connected to the rear frame supports. Each of the connecting pieces has a forked end opposite each of the rear frame supports with a hollow first cylindrical member and a bearing member transverse to the rear frame supports. The first cylindrical member has an inner surface with a first set of gear teeth. A substantially U-shaped handle has a pair of arm portions and a pair of hollow second cylindrical members respectively integrated with the arm portions and transverse to the same. Each of the second cylindrical members similarly has an inner surface formed with a second set of second gear teeth. Each of the second cylindrical members extend into a space formed between the first cylinrical member and the bearing member of one of the rear frame supports. A movable control piece is disposed in the first and the second cylindrical members. The movable control piece has a cylindrical wall with external gear teeth formed adjacent to an inner end. The external gear teeth releasably engage the first and second sets of gear teeth. A first basing means urges the movable control piece to force the external gear teeth into a position engaging the first and second sets of gear teeth. The U-shaped handle can be rotated relative to the rear frame supports when the external gear teeth are disengaged from first and second sets of gear teeth.

Each of the connecting pieces has an elongated transverse curved slot formed adjacent to each of the rear frame supports. Each of the rear frame supports has an elongated axial opening communicated with a plurality of spaced transverse notches to be adjustably aligned with the transverse curved slot. A control panel is pivotably attached to each of the connecting pieces. The control panel has a stub member projecting into the transverse curved slot and the axial opening. The control panel is rotatable, so the stub member can move in the transverse curved slot between a first position in which the stub member engages one of the transverse notches, and a second position in which the stub member is in the axial opening. A second biasing means urges the stub member towards the first position. When the stub member is in the second position, the connecting pieces may be pulled or pushed relative to the rear frame supports to adjust the height of the U-shaped handle.

The rear frame supports are movable between two positions on a pair of arm rests of the stroller. Each of the rear frame supports has a movable hook body attached to it to releasably lock the rear frame support against one of the arm rests at one of the two locking positions. Each of the rear frame supports further has an elongated axial slot adjacent to the movable hook body. The movable hook body has a transverse rod able to move in a vertically inside the elongated axial slot. A third biasing means urges the transverse rod downward to place the movable hook bodies in a locking position against the arm rests. Each of the connecting pieces further has a handle lever hinged thereto and a transmitting cord interconnecting the handle lever and the transverse rod. The handle lever moves the movable hook body away from the locking position by means of the transmitting cord when the handle lever is operated. The rear frame supports can thus be moved to the other locking position on the arm rests to change the position of the handle relative to the front of the stroller.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 2:
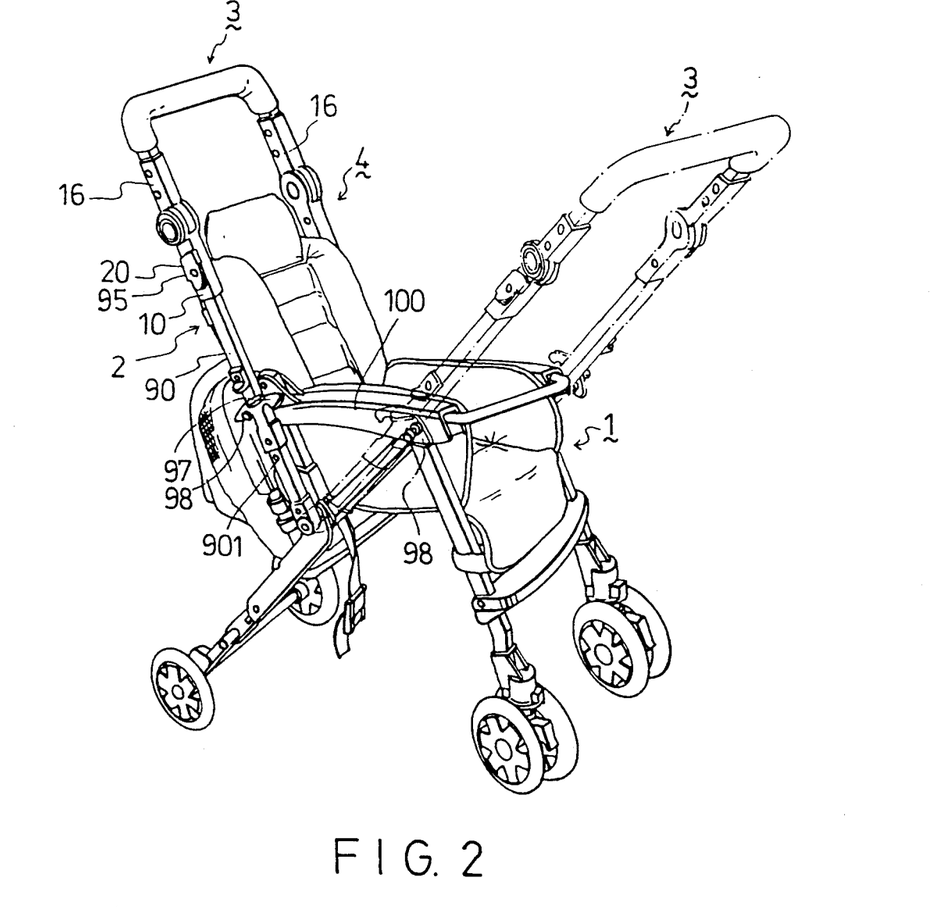
FIG. 2 is a perspective view of the first preferred embodiment of a stroller according to this invention.
Figure 3:
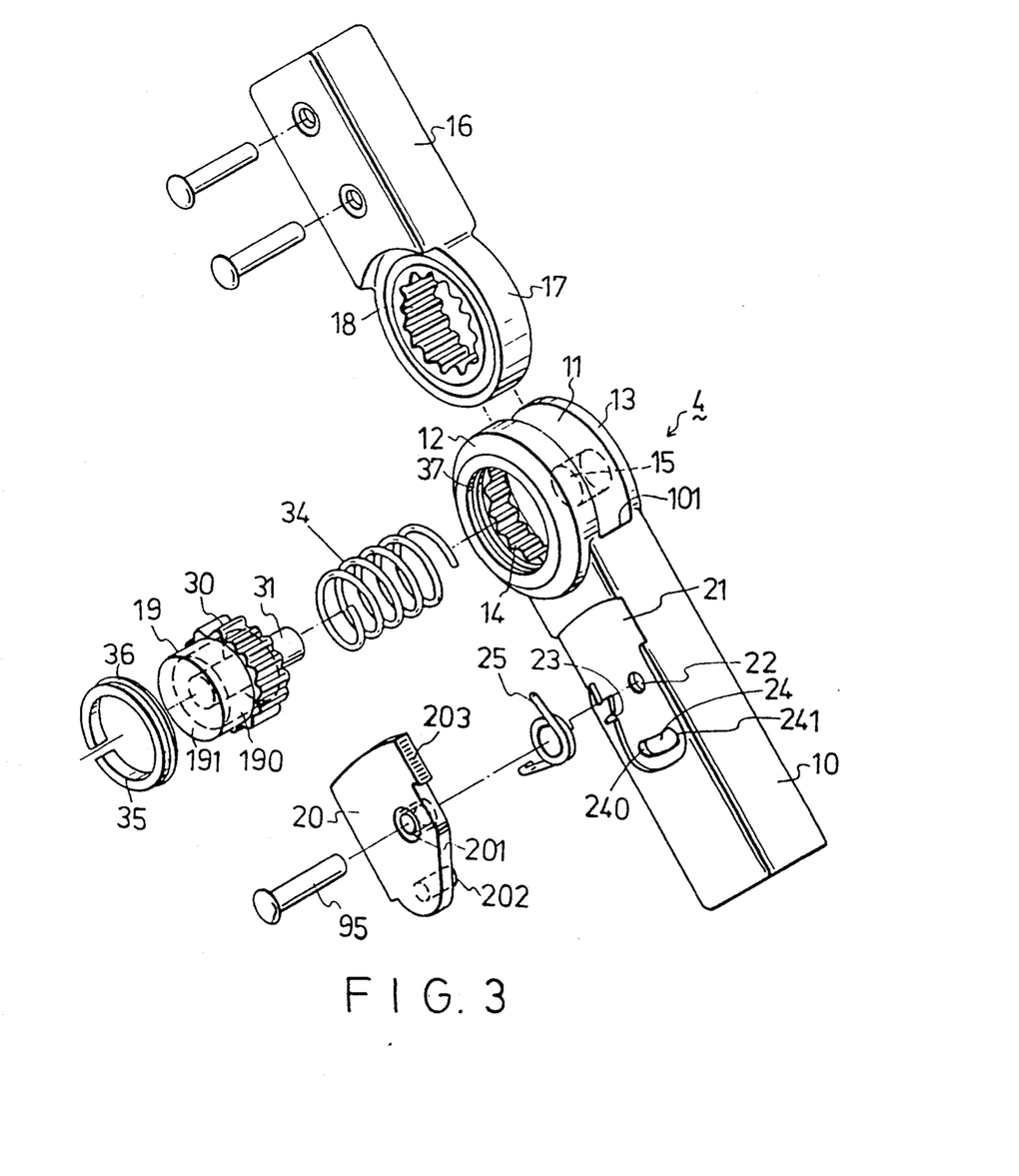
FIG. 3 is an exploded view illustrating the connection between links of the first preferred embodiment.

Referring to FIGS. 2 and 3, the first preferred embodiment of a stroller according to this invention comprises a wheeled carriage frame 1, a pair of upwardly inclining rear frame supports 2, a substantially U-shaped handle 3, and a pair of connecting pieces 4 to join the U-shaped handle 3 to the rear frame supports 2.

The U-shaped handle 3 has a pair of arm portions 16. Each of the arm portions 16 has a pair of hollow cylindrical members 17 integrated with the arm portions 16. Each of the cylindrical members 17 has an inner surface with gear teeth 18. The axes of the cylindrical members 17 are transverse to the arm portions 16.

Each of the connecting pieces 4 comprises a hollow rectangular tube 10 having a concave face 101 with a hollow cylindrical member 12 integrated with the rectangular tube 10 at a first peripheral side edge of the concave face 101. A substantially hemispherical bearing member 13 is similarly integrated with the rectangular tube 10 at a second peripheral side edge of the concave face 101 opposite the cylindrical member 12. Both the cylindrical member 12 and the substantially hemispherical member 13 have axes transverse to the rectangular tube 10. Each of the cylindrical members 17 extends into a space 11 between the cylindrical member 12 and the hemispherical member 13. The cylindrical member 12 has an inner surface with gear teeth 14. The hemispherical member 13 is formed with a central through hole 15. One end of each of the upwardly inclining rear frame supports 2 is received in the rectangular tubes 10.

Figure 4:
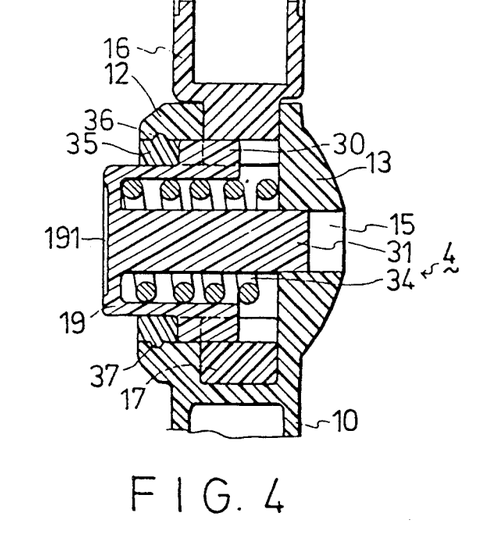
FIGS. 4 and 5 are sectional views illustrating the operation of a first adjusting means of the first preferred embodiment.
Figure 5:
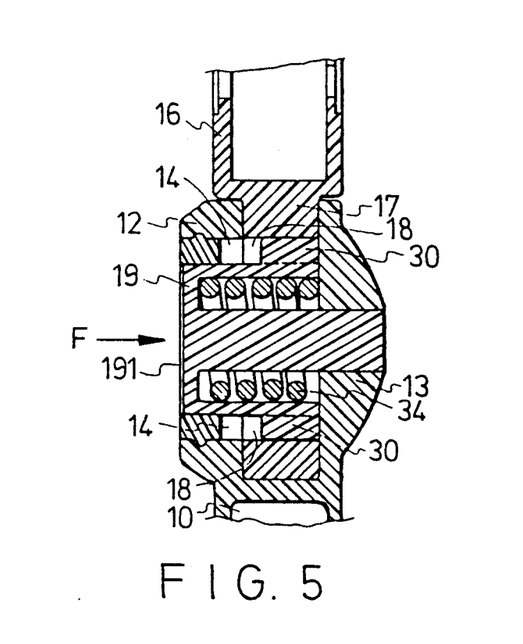

A control piece 19 has a cylindrical wall 190 with a closed outer end 191. An axial shaft 31 projects from an inner face of the closed end 191 and extends out of the cylindrical wall 190. As shown in FIGS. 4 and 5, a porton of the cylindrical wall 190 adjacent an inner end has external gear teeth 30 which mesh with the internal gear teeth 14 and 18. A compression spring member 34 surrounds the length of the axial shaft 31. A C-shaped ring 35 has an outwardly projecting radial flange 36 which is received by an annular groove 37 of the cylindrical member 12.

Referring once more to FIG. 4, when the control piece 19 is in its normal position, the spring member 34 urges the closed end 191 of the control piece 19 away from the hemispherical member 13. One end of the axial shaft 31 projects into the through hole 15. The external gear teeth 30 mesh with the internal gear teeth 14 and 18 to prevent rotation of the arm portion 16 relative to the connecting piece 4. The C-shaped ring 35 abuts the external gear teeth 30 to prevent disengagement of the control piece 19.

When a pressing force F is applied to the closed end 191 of the control piece 19, as shown in FIG. 5, the control piece 19 moves towards the hemispherical member 13 and the spring member 34 is compressed. The axial shaft 31 extends further into the through hole 15 and the external gear teeth 30 cease to mesh with the internal gear teeth 14 of the cylindrical member 12. The arm portion 16 is then free to rotate relative to the connecting piece 4. One end of the control piece 19 abuts the hemispherical member 13 to prevent further inward movement. Once the arm portion 16 is placed in the desired position, it is locked thereat by relieving the pressing force F on the closed end 191 of the control piece 19. The spring member 34 then expands and urges the control piece 19 into the normal position. The external gear teeth 34 once more engage the internal gear teeth 14 and 18, thus preventing rotation of the arm portion 16 relative to the connecting piece 4. Referring again to FIG. 2, the U-shaped handle 3 can be made to incline relative to the rear frame supports 2 by turning the U-shaped handle 3 while the control pieces 19 are depressed, the degree of inclination of which can be adjusted according to the desired setting.

Figure 6:
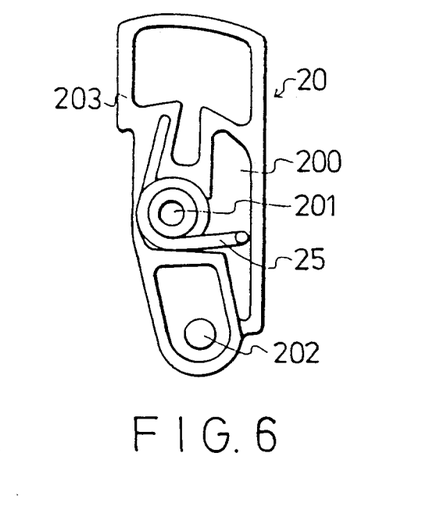
FIGS. 6 and 7 illustrate a second adjusting means of the first preferred embodiment.
Figure 7:
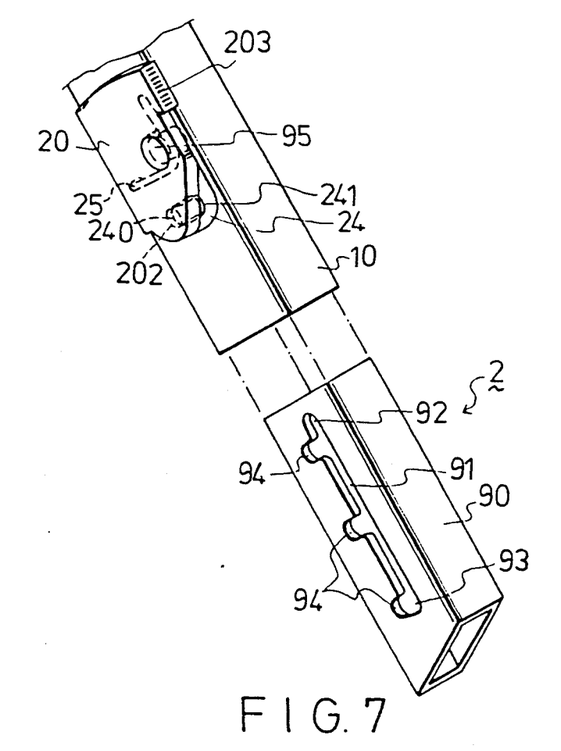

Referring to FIGS. 3, 6 and 7, the preferred embodiment of a stroller according to this invention further comprises a control panel 20 abutting the rectangular tube 10 at a recessed portion 21 formed near the concave face 101. The shape of the recessed portion 21 complements that of the control panel 20. The recessed portion 21 is formed with a mounting hole 22 and an elongated transverse curved slot 24 disposed below the mounting hole 22. The control panel 20 has a recess 200 on a rear surface. A rearwardly projecting hollow stud 201 protrudes from the control panel 20. A stub member 202 similarly protrudes inwardly of the control panel 20 near an extreme lower end of the same. A biasing means 25 is disposed at the recess 200 and is twisted around the hollow stud 201. One end of the biasing means 25 is fixed to the control panel 20. The other end of the biasing means 25 is fixed to the rectangular tube 10 at a notch 23 formed thereon. A peripheral projection 203 has a coarse side face and extends from a peripheral side edge of the control panel 20.

Each of the rear frame supports 2 has a hollow rectangular pipe member 90 received in one end of the rectangular tube 10. The pipe member 90 has a side wall formed with an elongated axial opening 91 with two extreme ends 92 and 93. The pipe member 90 further has three spaced notches 94 formed transverse to the axial opening 91 and communicated with the same.

A fastening member 95 extends through the hollow stud 201 of the control panel 20 and into the mounting hole 22 of the rectangular tube 10. The stub member 202 projects through the curved slot 24 and into the axial opening 91 of the pipe member 90. The biasing means 25 urges the stub member 202 towards one end 240 of the curved slot 24 and into one of the notches 94. The pipe member 90 is thus fixed relative to the rectangular tube 10 and the U-shaped handle 3 is kept at a constant distance away from the rear frame supports 2.

When a pressing force is applied to the control panel 20 at the peripheral projection 203, the control panel 20 rotates about the fastening member 95, thus moving the stub member 202 towards the end 241 of the curved slot 24. The stub member 202 therefore disengages the notch 94 and the rectangular tube 10 may then be pulled or pushed relative to the pipe member 90 to adjust the distance of the U-shaped handle 3 from the rear frame supports 2. Once the distance has been adjusted to the preferred setting, the pressing force to the control pan 1 20 is relieved. The biasing means 25 then urges the stub member 202 to engage another one of the notches 94. thus locking the U-shaped handle 3 in its new position Referring again to FIG. 2 in combination with FIGS. 8, 9 and 10, a second preferred embodiment of a stroller according to this invention is shown. Each of the rear frame supports 2 further comprise an inwardly projecting pin 901 and an elongated axial slot 902 disposed above the projecting pin 901. Each of a pair of oppositely disposed movable hook bodes 97 engage a mounting post 98 formed on each end of a pair of arm rests 100 of the wheeled carriage frame 1. Each of the movable hook bodies 97 has a transverse rod 971 protruding into the axial slot 902. A spring unit 972 has two ends fixed to the transverse rod 971 and to the projecting pin 901. The transverse rod 971 moves vertically inside the ax al slot 902. The spring unit 972 urges the transverse rod 971 downward to place the movable hook body 97 in a locking position against one of the mounting posts 98. A lower end of each of the rear frame supports 2 opposite the U-shaped handle 3 is hinged to the wheeled carriage frame 1. As shown by the dotted lines, the rear frame supports 2 can be moved to engage the movable hook bodes 97 with one of the mounting posts 98, thus changing the position of the U-shaped handle 3 on the stroller.

Figure 8:
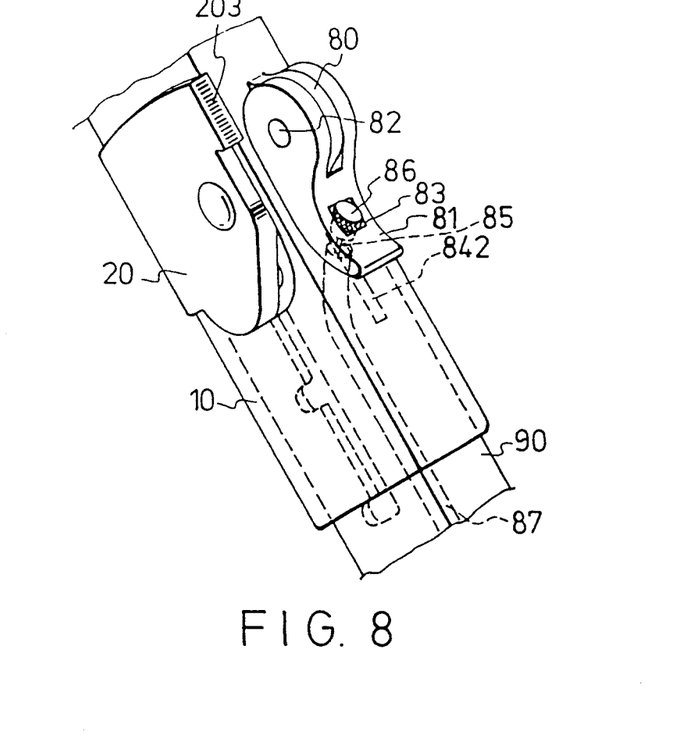
FIGS. 8, 9 and 10 are illustrations of a third adjusting means possessed by a second preferred embodiment of the stroller according to this invention.
Figure 9:
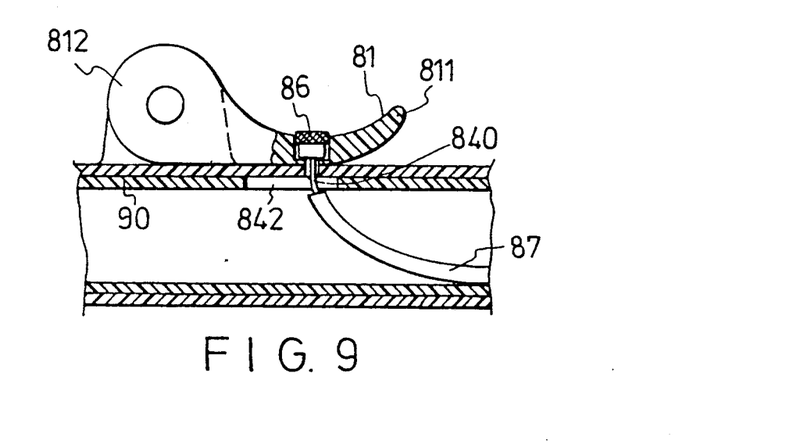
Figure 10:
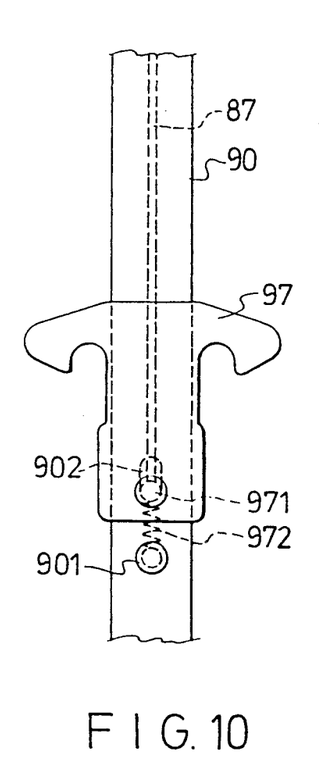

The second preferred embodiment further comprises a pair of outwardly protruding hinge seats 80, each projecting from one of the walls of the rectangular tubes 10 adjacent to the peripheral projection 203 of the control panels 20. Each of a pair of handle levers 81 has a curved first end 812 hinged by a hinge pin 82 to one of the hinge seats 80. Each handle lever 81 further has an upwardly curving second end 811 and a through hole 83 formed on a lowest point of the handle lever 81. The rectangular tube 10 is formed with a through hole 841 which is aligned with the through hole 83. The pipe member 90 has an elongated slot 842 aligned with the through hole 841. A transmitting cord 85 passes through the through holes 83 and 841 and the elongated slot 842, and extends inside the pipe member 90. One end of the transmitting cord 85 is fixed to the transverse rod 971. A second end of the transmitting cord 85 is fixed to a cap member 86 disposed at the through hole 83. The portion of the transmitting cord 85 extending inside the pipe member 90 is sheathed with a plastic tube 87, the diameter of which prevents the same from passing through the elongated slot 842. As a pulling force is applied to the curving second end 811 of the handle lever 81, the transmitting cord 85 similarly pulls the movable hook body 97 away from the locking position so as to disengage the same from the mounting post 98. This permits movement of the rear frame supports 2 so that the movable hook bodies 97 can engage the other mounting post 98 to change the position of the U-shaped handle 3 on the stroller. The stroller may therefore be pushed from the front or from the rear, depending upon the user's preference and convenience.

As described in the preceding paragraphs, the position of the U-shaped handle 3 of the preferred embodiment may be adjusted in three ways: (a) the degree of inclination of the U-shaped handle 3 relative to the rear frame supports 2 may be varied; (b) the height of the U-shaped handle 3 from the rear frame supports 2 may be changed; and (c) the position from which the user pushes the stroller may also be changed. The control pieces 19 are used to vary the angle of inclination. The control panels 20 are used to change the height of the handle by adjusting the telescopic connection between the connecting piece 4 and the rear frame support 2. The handle lever 81 is used to change the pushing position of the stroller.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A stroller, comprising:

a wheeled carriage frame;

a pair of hollow upwardly inclining rear frame supports mounted to the wheeled carriage frame;

a pair of hollow connecting pieces telescopically connected to said rear frame supports, each of said connecting pieces having a forked end opposite each of said rear frame supports, said forked end having a hollow first cylindrical member and a bearing member spaced from said first cylindrical member, said first cylindrical member having an inner surface formed with first gear teeth, said bearing member having a central first through hole, said first cylindrical member and said bearing member having an axis transverse to said rear frame supports;

a substantially U-shaped handle having a pair of arm portions and a pair of hollow second cylindrical members respectively integrated with said arm portions, each of said second cylindrical members similarly having an inner surface formed with second gear teeth and an axis transverse to said arm portions, each of said second cylindrical members extending into a space formed between said first cylindrical member and said bearing member of one of said rear frame supports;

a pair of movable control pieces, each of said movable control pieces being disposed in said first and said second cylindrical members, each of said movable control pieces having a hollow cylindrical wall with an inner end, an outer end and external gear teeth formed adjacent said inner end, said external gear teeth engaging said first and said second gear teeth but releasable from one of said first and said second gear teeth; and a first biasing means urging each of said movable control pieces so as to move said external gear teeth to an engaging position relative to both of said first and said second gear teeth;

whereby, said U-shaped handle can be rotated relative to said rear frame supports when said movable control pieces are moved against the action of said first biasing means, wherein said outer end of said cylindrical wall of each of said movable control pieces is a closed end, each of said movable control pieces further having an axial shaft projecting inwardly from an inner surface of said outer end of said cylindrical wall and extending past said inner end of said cylindrical wall into said central first through hole of said bearing member of one of said connecting pieces, wherein said first biasing means is a compression spring disposed around said axial shaft of each of said movable control pieces between said outer end of said cylindrical wall and said bearing member of one of said connecting pieces and wherein each of said connecting pieces further comprises a C-shaped locking ring disposed between said first cylindrical member and said cylindrical wall of one of said movable control pieces adjacent said outer end of said cylindrical wall so as to prevent the release of said movable control pieces.

2. A stroller, comprising:

a wheeled carriage frame;

a pair of hollow upwardly inclining rear frame supports mounted to the wheeled carriage frame;

a pair of hollow connecting pieces telescopically connected to said rear frame supports, each of said connecting pieces having a forked end opposite each of said rear frame supports, said forked end having a hollow first cylindrical member and a bearing member spaced from said first cylindrical member, said first cylindrical member having an inner surface formed with first gear teeth, said bearing member having a central first through hole, said first cylindrical member and said bearing member having an axis transverse to said rear frame supports;

a substantially U-shaped handle having a pair of arm portions and a pair of hollow second cylindrical members respectively integrated with said arm portions, each of said second cylindrical members similarly having an inner surface formed with second gear teeth and an axis transverse to said arm portions, each of said second cylindrical members extending into a space formed between said first cylindrical member and said bearing member of one of said rear frame supports;

a pair of movable control pieces, each of said movable control pieces being disposed in said first and said second cylindrical members, each of said movable control pieces having a cylindrical wall with an inner end, an outer end and external gear teeth formed adjacent said inner end, said external gear teeth engaging said first and said second gear teeth but releasable from one of said first and said second gear teeth; and a first biasing means urging each of said movable control pieces so as to move said external gear teeth to an engaging position relative to both of said first and said second gear teeth;

whereby, said U-shaped handle can be rotated relative to said rear frame supports when said movable control pieces are moved against the action of said first biasing means wherein each of said connecting pieces has an elongated transverse curved slot formed adjacent to each of said rear frame supports; each of said rear frame supports having an elongated axial opening communicated with a plurality of spaced transverse notches to be adjustably aligned with said transverse curved slot; said stroller further comprising a control panel pivotably attached to each of the said connecting pieces, said control panel having a stub member projecting into said transverse curved slot and said axial opening, said control panel being rotatable to move said stub member into said transverse curved slot between a first position in which said stub member engages one of said transverse notches and a second position in which said stub member is in said axial opening; and a second biasing means urging said stub member towards said first position.

3. A stroller comprising:

a wheeled carriage frame;

a pair of hollow upwardly inclining rear frame supports mounted to the wheeled carriage frame;

a pair of hollow connecting pieces telescopically connected to said rear frame supports, each of said connecting pieces having a forked end opposite each of said rear frame supports, said forked end having a hollow first cylindrical member and a bearing member spaced from said first cylindrical member, said first cylindrical member having an inner surface formed with first gear teeth, said bearing member having a central first through hole, said first cylindrical member and said bearing member having an axis transverse to said rear frame supports;

a substantially U-shaped handle having a pair of arm portions and a pair of hollow second cylindrical members respectively integrated with said arm portions, each of said second cylindrical members similarly having an inner surface formed with second gear teeth and an axis transverse to said arm portions, each of said second cylindrical members extending into a space formed between said first cylindrical member and said bearing member of one of said rear frame supports;

a pair of movable control pieces, each of said movable control pieces being disposed in said first and said second cylindrical members, each of said movable control pieces having a cylindrical wall with an inner end, an outer end and external gear teeth formed adjacent said inner end, said external gear teeth engaging said first and said second gear teeth but releasable from one of said first and said second gear teeth; and a first biasing means urging each of said movable control pieces so as to move said external gear teeth to an engaging position relative to both of said first and said second gear teeth;

whereby, said U-shaped handle can be rotated relative to said rear frame supports when said movable control pieces are moved against the action of said first biasing means further comprising a pair of arm rests, said rear frame supports being movable between two positions on said arm rests, each of said rear frame supports having a movable hook body attached thereto to selectively lock said rear frame support to said arm rest at one of said two positions, each of said rear frame supports further having an elongated axial slot adjacent to said movable hook body, said movable hook body having a transverse rod extending into said elongated axial slot in one of said rear frame supports, said transverse rod being vertically movable inside said elongated axial slot, said stroller further including a third biasing means urging said transverse rod downward to place said movable hook body in a locking position against said arm rest, each of said connecting pieces further having a handle lever hinged thereto and a transmitting cord interconnecting said handle lever and said transverse rod, said handle lever moving said movable hook body away from said locking position by means of said transmitting cord when said handle lever is operated.

* * * * *